April 11, 1961 R. B. SOPER ET AL 2,978,804

METHOD OF CLASSIFYING NON-MAGNETIC ELEMENTS

Filed Aug. 13, 1958 2 Sheets-Sheet 1

INVENTORS.
RALPH B. SOPER and
RICHARD C. TONNER

BY Elmer J. Nealon

ATTORNEY.

METHOD OF CLASSIFYING NON-MAGNETIC ELEMENTS

Filed Aug. 13, 1958 2 Sheets-Sheet 2

INVENTORS.
RALPH B. SOPER and
RICHARD C. TONNER
BY Elmer J. Nealon
ATTORNEY.

2,978,804

METHOD OF CLASSIFYING NON-MAGNETIC ELEMENTS

Ralph B. Soper, North Weymouth, and Richard C. Tonner, Braintree, Mass., assignors, by mesne assignments, to Sylvania Electric Products Inc., Wilmington, Del., a corporation of Delaware Filed Aug. 13, 1958, Ser. No. 754,859

6 Claims. (Cl. 29—413)

This invention relates to methods for separating from a quantity of small elements formed by subdividing a body of non-magnetic material, those elements which include a portion of a predetermined external surface region of the original body. More particularly, it is concerned with a method for separating whole semiconductor dice from the partial dice which include the material from the peripheral edges of the semiconductor wafer from which the dice have been obtained.

In the manufacture of semiconductor electrical translating devices, such as diodes and transistors of well known types, the active semiconductor elements employed therein must generally be in the form of small thin pieces or chips commonly known as dice. These dice are produced from blocks or ingots of semiconductor material such as, for example, germanium or silicon. The ingots are obtained from the steps involved in purification, controlled addition of doping impurities, and formation of the semiconductor material into the desired crystal structure.

It is a common practice first to divide an ingot of appropriately prepared semiconductor material into slabs or wafers by repeatedly slicing parallel to one end of the ingot and subsequently to divide the wafers so produced into dice of the desired lateral dimensions. Because of the extreme hardness and brittleness of semiconductor materials, the ingot generally is sliced into wafers with a rotating saw or cutting wheel the periphery of which is charged with diamond particles. Each wafer of the semiconductor material is then secured to a supporting plate and is subjected to various processes such as grinding, polishing, etching, and plating preparatory to subdivision into dice.

One method of dicing involves suitably attaching the wafer of semiconductor material to a backing or supporting plate of material readily cut by sawing and passing the mounted wafer through a gang of saws carefully set barely to cut through the wafer into the backing plate. The wafer and backing plate are then rotated 90° and passed through a gang of saws again. The individual dice are subsequently detached from their mounting. Alternatively the dicing may be accomplished by scribing the surface of the wafer with a pointed tool in order to produce intersecting sets of grooves defining the edge boundaries of the dice and then breaking the wafer along the grooves. Still another method of dicing involves coating the wafer with an inert masking material and scoring one surface of the masked wafer to produce channels through the mask which define the edge boundaries of the dice. The wafer then is placed in a chemical etching solution which dissolves semiconductor material at the exposed channels and thereby divides the wafer into dice.

Included with the dice of the desired lateral dimensions obtained from the wafer by any of the foregoing dicing methods are incomplete or partial dice. These dice are the edge pieces formed from the material in the region of the periphery of the wafer. Since the edges of the wafer are usually irregular, all the edge pieces are considered of unsuitable configuration and must be separated from the whole or complete dice of predetermined desired shape and dimensions. Separation and discarding of these edge pieces is of importance particularly when further processing is to be performed automatically or semiautomatically. Small chips and pieces may cause jamming or other malfunctioning of equipment and larger pieces inadvertently may be processed to produce substandard devices with consequent expense and waste of other materials.

Separating the outsize edge pieces from the whole die is generally an inefficient hand operation. Normally the operator must examine each piece, visually determine whether or not the piece is of the desired size, and separate by hand those which are not perfect. Because only perfect, whole dice are useable and since dice as small as .030 inch square are employed in some semiconductor devices, the procedure must often be done with the aid of a magnifying glass. As with any such slow, tedious operation requiring operator discretion the incidence of errors is very high.

It is an object of the invention, therefore, to provide an improved method for separating from a quantity of small elements formed by subdividing a body those elements which include a portion of a predetermined external surface region of the original body.

It is a more specific object of the invention to provide an improved method for separating edge pieces from the mixed quantity of edge pieces and whole dice formed by subdividing a wafer or slice of semiconductor material.

Briefly, in accordance with the method of the invention a coating of magnetic material is applied to a region on the surface of a body of non-magnetic material which is to be divided. The body then is divided into a quantity of small elements, and thereafter a magnetic field is applied to the quantity of elements in order to attract and remove from the quantity those elements having a portion of the magnetic coating on their surfaces. As applied to the production of dice of semiconductor material from thin slices or wafers, the method involves first applying a layer of magnetic material to the surfaces of the wafer at its periphery. Next, the wafer is diced by following any of the techniques discussed hereinabove. The quantity of elements produced then is subjected to a magnetic field. Edge pieces from the periphery of the wafer containing the magnetic material are attracted by the magnetic field and thus are separated from the whole dice obtained from the central region of the wafer.

Additional objects, features, and advantages of the method of the invention will become apparent from the following detailed discussion and the accompanying drawings wherein.

Throughout the drawings, various dimensions have been distorted out of proportion in the interest of clarity in presentation. In particular, the thickness of the semiconductor wafers and the dimensions of the coating of magnetic material are exaggerated.

Figure 1:
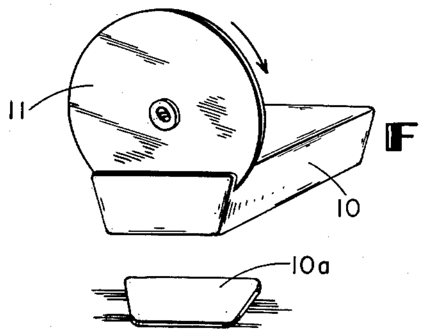
Fig. 1 is a perspective view of an ingot of semiconductor material being sliced into wafers.

Referring to the drawings, an ingot or block 10 of a semiconductor material such as, for example, germanium or silicon, is sliced into slabs or wafers 10*a* as shown in Fig. 1. Slicing is generally done with a rotating cutting wheel 11, the periphery of which is charged with diamond particles. The wafers may then be reduced in thickness by lapping or by chemical etching. Other treatments such as, for example, the diffusion into the wafers of conductivity type imparting impurities may be carried out at this stage of the process.

Figure 2:
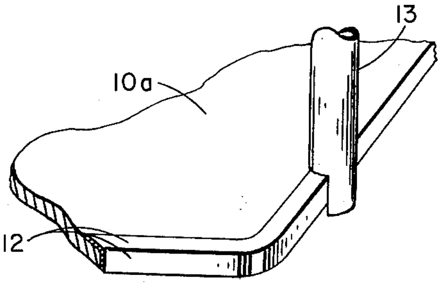
Fig. 2 is a perspective view of a portion of a semiconductor wafer showing magnetic material being applied adjacent the peripheral edge of the wafer.

In accordance with the method of the invention a coating of a magnetic material is applied to the periphery of the wafer. The coating material may be any substance, conveniently in liquid form as applied, which adheres suitably to the surfaces of the semiconductor wafer and has magnetic properties such that it will be attracted by a magnetic field. Powdered iron, nickel, or cobalt suspended in a lacquer, shellac, resin, or other suitable binder may be employed. The magnetic liquid may be applied by any suitable method. Fig. 2 shows the magnetic material 12 being applied in liquid form through a notched tube 13. The liquid material flows through the tube and coats the periphery of the wafer including the extreme edge surface as well as the edge region of the upper major surface of the wafer as shown. The coating dries to form a bead of magnetic material at the outer rim of the wafer. Although it is necessary to apply the magnetic material only to the extreme edge surface of the wafer, it is preferable, particularly in the processing of very thin wafers, to extend the coating onto the edge region of the major surface in order to insure adequate bonding of the magnetic material to the wafer. However, if it is considered desirable, the magnetic material may be applied only to the edge region of the major surface to the exclusion of the extreme edge surface.

Figure 3:
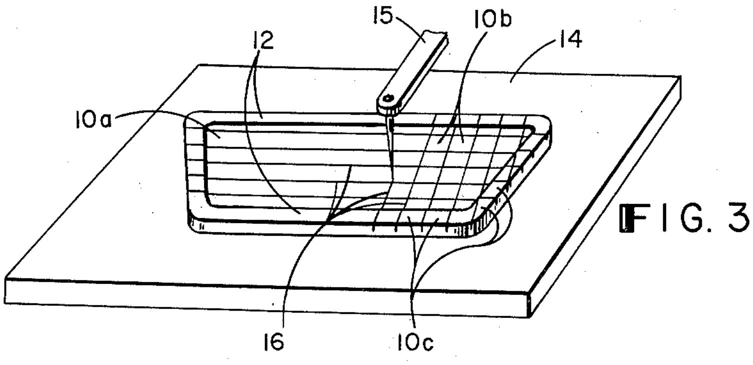
Fig. 3 is a perspective view of a wafer of semiconductor material with magnetic material applied being scribed in the operation of dicing.
Figure 4:
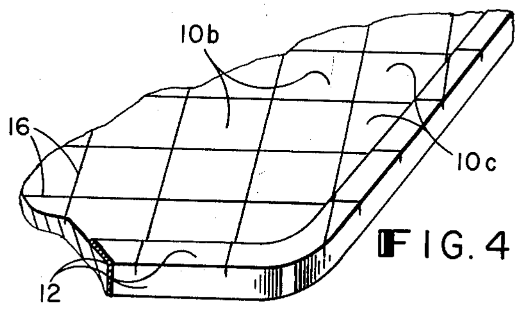
Fig. 4 is an enlarged view showing a portion of the wafer of Fig. 3.

The wafer 10*a* of semiconductor material with the bead of magnetic material 12 applied to its periphery is attached to a mounting plate 14 with a suitable adhesive as shown in Fig. 3. The exposed major surface of the wafer then is scribed with a diamond tipped scribing tool 15 to form intersecting sets of grooves. The scribed lines 16 define the lateral dimensions for the whole dice 10*b* and also delimit the edge pieces 10*c* as best shown in Fig. 4. After the wafer has been scribed, it is detached from the mounting block and broken up along scribed grooves. The individual whole dice 10*b* from the central region of the wafer as well as the edge pieces 10*c* with portions of the magnetic material adhering to them are thus formed from the semiconductor wafer 10*a*.

Figure 5:
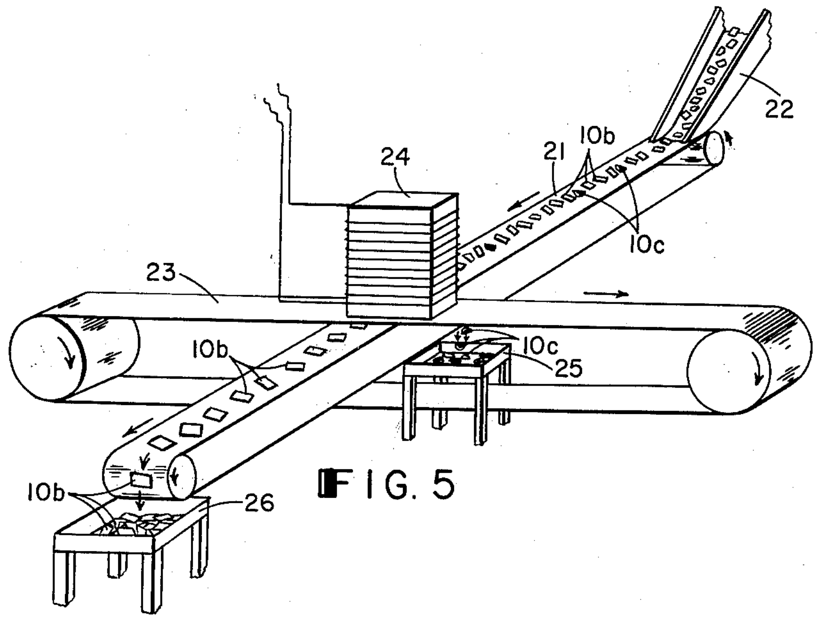
Fig. 5 is a perspective view of an illustrative apparatus for separating the edge pieces from the whole dice by magnetic attraction.

The quantity of edge pieces and whole dice produced are then subjected to a magnetic field in order to separate out the edge pieces. One form of apparatus which may be employed for automatically performing the sorting operation is illustrated in Fig. 5. The apparatus includes a first conveyor belt 21 onto which the semiconductor elements are fed in orderly fashion from the feeding track 22 of a feeding mechanism (not shown). A second conveyor belt 23 travels in a direction transverse to that of the first belt and is slightly above the first belt. A magnet 24, shown as an electromagnet, is positioned above the second belt in the region where the two belts cross. The magnet is located within the edges of the second belt and extends slightly beyond the edge of the first belt in the direction of movement of the second belt.

In operating the apparatus, the two belts are driven in the directions indicated by the arrows shown in the figure utilizing suitable driving means (not shown). The quantity of whole dice 10*b* and edge pieces 10*c* are placed in the feeding mechanism and are fed one at a time out the feeding track 22 and onto the first conveyor belt 21. As the semiconductor elements pass under the magnet, the edge pieces 10*c*, by virtue of the magnetic material adhering thereto, are attracted by the magnetic field and are forced upward against the underside of the second belt 23. The edge pieces are carried along by the movement of the belt, and as they pass beyond the edge of the magnet, the field weakens and the pieces fall into a receptacle 25. The non-magnetic, whole, semiconductor dice 10*b* move along on the first conveyor belt uninfluenced by the magnetic field. These dice travel the length of the belt and then drop into a receptacle 26. The whole dice are thus separated from the edge pieces and may then be further processed according to various well known techniques for incorporation into known forms of electrical translating devices.

In order that those familiar with the semiconductor art may better understand the method of the invention, the following typical procedure is described with reference again to the figures of the drawings.

A wafer approximately .012 inch thick is sliced from a germanium ingot 10 of generally trapezoidal cross sectional area of about 1.5 square inches. The wafer is then lapped and chemically etched to a thickness of about .006 inch. A magnetic paint consisting of iron powder in a nitro-cellulose lacquer is applied to the periphery of the wafer by means of a notched tube 13 having an outside diameter of .028 inch and an inside diameter of .016 inch. Specifically, the magnetic paint employed consists of a mixture of 13 parts by weight of iron powder (particle size under 10 microns), 17 parts by weight of a cellulose nitrate lacquer sold by Howe and French Inc. as No. 3496 Lacquer, and 4 parts by weight of amyl acetate. The magnetic paint 12 dries quickly and forms a bead approximately .001 inch thick on the peripheral surfaces of the wafer. The width of the strip of material on the upper major surface of the wafer is about .025 inch.

The wafer is then mounted on a holding plate 14 and scribed with a diamond tipped tool 15 to form two sets of parallel grooves 16 which intersect to form a pattern of .080 by .080 inch squares on the surface of the wafer. After the wafer is scribed, it is removed from the mounting plate 14 and broken up along the scribed lines. Whole dice 10*b*, .080 by .080 inch square, and .006 inch thick, are thereby formed from the central region of the wafer. Edge pieces 10*c* having portions of the magnetic bead attached thereto are also formed.

The quantity of semiconductor elements thus produced are then placed in the feeding mechanism of the sorting apparatus. The elements are carried under the magnet 24 by the first conveyor belt 21. Magnetic attraction for the iron powder in the bead material 12 causes the edge pieces 10*c* to be lifted off the first conveyor belt and to be held against the underside of the second conveyor belt 23. Movement of the second conveyor belt carries the edge pieces beyond the first conveyor belt and away from the magnet, thus permitting the edge pieces to drop into a receptacle 25. Whole dice 10*b* are not affected by the magnet and continue to move along the first conveyor belt and into another receptacle 26.

What is claimed is:

1. The method of separating from a quantity of small elements formed by the subdivision of a body of non-magnetic material those elements which include a portion of a predetermined external surface region of the original body, said method including the steps of coating an external surface region of said body with a magnetic material, subdividing said body into a quantity of small elements, and subjecting the quantity of small elements to a magnetic field to remove elements which include a portion of said external surface region of the original body from said quantity by magnetic attraction of the magnetic field for the magnetic material.

2. The method of separating from a quantity of small elements formed by the subdivision of a body of non-magnetic material those elements which include a portion of a predetermined external surface region of the original body, said method including the steps of applying a magnetic material to a region on the external surface of said body, subdividing said body into a quantity of small elements, and applying a magnetic field to said quantity of elements to remove elements which include a portion of said region of the original body by magnetic attraction of the magnetic field for the magnetic material.

3. The method of separating elements formed from the material of the periphery of a wafer of semiconductor material from other elements formed from the wafer, said method including the steps of applying a magnetic coating to the periphery of said wafer, dividing said wafer to form a quantity of small semiconductor elements, and subjecting said quantity of elements to a magnetic field to attract elements formed from the material of the periphery of the original wafer.

4. The method of separating elements formed from the material of the periphery of a wafer of semiconductor material from elements formed from the central region of the wafer, said method including the steps of applying a coating of magnetic material suspended in a binder to the periphery of said wafer, drying said magnetic material and binder to form a magnetic band adhering to said periphery, dividing said wafer to form a quantity of semiconductor elements, applying a magnetic field to said quantity of elements and thereby separating from said quantity those elements including portions of the periphery of the original wafer by magnetic attraction for the magnetic material of the band.

5. In the method of producing small dice from the central region of a thin wafer of semiconductor material, the steps which include applying a coating of magnetic material to the surface of said wafer of semiconductor material at the periphery of the wafer, dividing said wafer to form a quantity of small elements, said quantity consisting of whole dice from the central region of the wafer and edge pieces from the periphery of the wafer, said edge pieces having magnetic material adhering thereto, moving said elements along a path, and establishing a magnetic field above a portion of said path, said magnetic field removing said edge pieces from said path by magnetic attraction for the magnetic material adhering to said edge pieces as the elements pass through said portion of said path.

6. In the method of producing small dice from a wafer of semiconductor material, the steps which include applying a coating of iron powder suspended in nitrocellulose lacquer to the periphery of the wafer, drying said iron powder and lacquer to form a bead of magnetic material adhering to the wafer, scribing the major surface of said wafer with a pointed tool to form intersecting sets of grooves in the major surface of the wafer, said grooves defining the lateral dimensions for semiconductor dice, breaking said wafer along said grooves to form a quantity of semiconductor elements, said quantity consisting of individual whole dice and edge pieces from the periphery of the wafer, said edge pieces having portions of the bead of magnetic material adhering thereto, moving said elements along a path, establishing a magnetic field above a portion of said path, said magnetic field removing the edge pieces from said path by magnetic attraction for the magnetic material adhering to said edge pieces as the elements pass beneath the magnetic field, and moving said edge pieces out of said magnetic field to a point remote from the whole dice.

References Cited in the file of this patent

UNITED STATES PATENTS 2,865,082 Gates ---------------- Dec. 23, 1958

FOREIGN PATENTS 207,886 Great Britain ----------- Dec. 7, 1925